(12) United States Patent  
Colantonio

(10) Patent No.: US 9,575,169 B2
(45) Date of Patent: Feb. 21, 2017

(54) ROTATING WINDOW AND RADOME FOR SURVEILLANCE POD

(71) Applicant: Goodrich Corporation, Charlotte, NC (US)

(72) Inventor: Peter Colantonio, North Andover, MA (US)

(73) Assignee: Goodrich Corporation, Charlotte, NC (US)

( * ) Notice: Subject to any disclaimer, the term of this patent is extended or adjusted under 35 U.S.C. 154(b) by 453 days.

(21) Appl. No.: 14/173,008

(22) Filed: Feb. 5, 2014

(65) Prior Publication Data

US 2016/0223664 A1    Aug. 4, 2016

Related U.S. Application Data

(60) Provisional application No. 61/905,884, filed on Nov. 19, 2013.

(51) Int. Cl.

| G01S 13/86 | (2006.01) |
|---|---|
| B64C 1/36 | (2006.01) |
| B64D 7/00 | (2006.01) |
| B64D 47/08 | (2006.01) |
| H01Q 5/22 | (2015.01) |
| H01Q 1/28 | (2006.01) |
| G03B 15/00 | (2006.01) |
| G01S 7/02 | (2006.01) |

(52) U.S. Cl.
CPC .............. *G01S 13/867* (2013.01); *B64C 1/36* (2013.01); *B64D 7/00* (2013.01); *B64D 47/08* (2013.01); *G01S 7/02* (2013.01); *H01Q 1/28* (2013.01); *H01Q 5/22* (2015.01); *G01S 2007/027* (2013.01); *G03B 15/006* (2013.01)

(58) Field of Classification Search
CPC ............. B64C 1/36; B64D 47/08; B64D 7/00; G01S 13/867; G01S 2007/027; G03B 15/006
USPC .......................................................... 342/53
See application file for complete search history.

(56) References Cited

U.S. PATENT DOCUMENTS

| 3,076,189 A | 1/1963 | Goddard |
|---|---|---|
| 4,298,280 A | 11/1981 | Harney |
| 4,593,288 A | 6/1986 | Fitzpatrick |
| 5,092,244 A | 3/1992 | Giglia |
| 5,129,323 A | 7/1992 | Park |
| 5,268,680 A | 12/1993 | Zantos |

(Continued)

FOREIGN PATENT DOCUMENTS

CA          2520091 A1    10/2004

OTHER PUBLICATIONS

European Search Report for European Application No. 14191321.0 mailed May 15, 2015.

*Primary Examiner* — Timothy A Brainard
(74) *Attorney, Agent, or Firm* — Carlson, Gaskey & Olds, PC

(57) ABSTRACT

A pod has a rotatable housing and a motor for driving the rotatable housing to rotate. The rotatable housing includes an image capture device for capturing an electromagnetic image and a radar transmitting and capturing device for capturing a radar image. The motor is operable to change an orientation of the rotatable housing relative to a pod housing, such that a desired one of the electromagnetic image capture device and the radar transmission and reception system faces an area that is to be studied. A method is also disclosed.

4 Claims, 2 Drawing Sheets

(56) References Cited

U.S. PATENT DOCUMENTS

| | | | |
|---|---|---|---|
| 5,927,648 A | 7/1999 | Woodland | |
| 6,056,237 A | 5/2000 | Woodland | |
| 6,484,619 B1* | 11/2002 | Thomas | G01S 13/867 89/37.01 |
| 9,122,948 B1* | 9/2015 | Zhu | G05D 1/0214 |
| 2010/0231441 A1* | 9/2010 | Pruett | G01S 13/90 342/25 A |
| 2012/0092499 A1 | 4/2012 | Klar et al. | |
| 2013/0051782 A1 | 2/2013 | Dimotakis | |
| 2013/0300870 A1 | 11/2013 | Messely et al. | |
| 2013/0342657 A1* | 12/2013 | Robertson | G01S 17/023 348/47 |
| 2014/0112588 A1* | 4/2014 | Yelton | G06T 3/4007 382/232 |
| 2014/0285375 A1* | 9/2014 | Crain | G01S 13/885 342/25 A |

* cited by examiner

ROTATING WINDOW AND RADOME FOR SURVEILLANCE POD

RELATED APPLICATION

This application claims priority to U.S. Provisional Application No. 61/905,884, filed Nov. 19, 2013.

BACKGROUND OF THE INVENTION

This application relates to a structure carrying both an image capture window for an electro-optic or infrared camera, and a radome for radar image capture.

Surveillance pods are known and are also known as reconnaissance pods. Typically, the pods may be attached to an aircraft.

A rotating housing is mounted within the pod and one type carries a window and an image capture device, such as a camera for capturing information in the form of electromagnetic images such as electro-optic or infrared images. Rotation of the housing allows the location of image capture on the ground to be varied. At times, the electromagnetic image may be obscured, for example, if there is cloud cover above the area on the ground of interest.

Radar image capture devices are also utilized in pods. A radar capture device will transmit and receive signals through a surface called a radome. To date, the electro-optic or infrared image capture devices have been mounted in a single, dedicated housing and the radar systems mounted in a separate, second housing.

In some applications, one may wish to utilize a radar capture device in combination with an electromagnetic image capture device. The requirement for having two entirely different devices, and their associated pods, has resulted in unduly large and complex systems.

SUMMARY OF THE INVENTION

A pod has a rotatable housing and a motor for driving the rotatable housing to rotate. The rotatable housing includes an image capture device for capturing an electromagnetic image and a radar transmitting and capturing device for capturing a radar image. The motor is operable to change an orientation of the rotatable housing relative to a pod housing, such that a desired one of the electromagnetic image capture device and the radar transmission and reception device faces an area of interest. A method is also disclosed.

These and other features may be best understood from the following drawings and specification.

DETAILED DESCRIPTION

Figure 1:
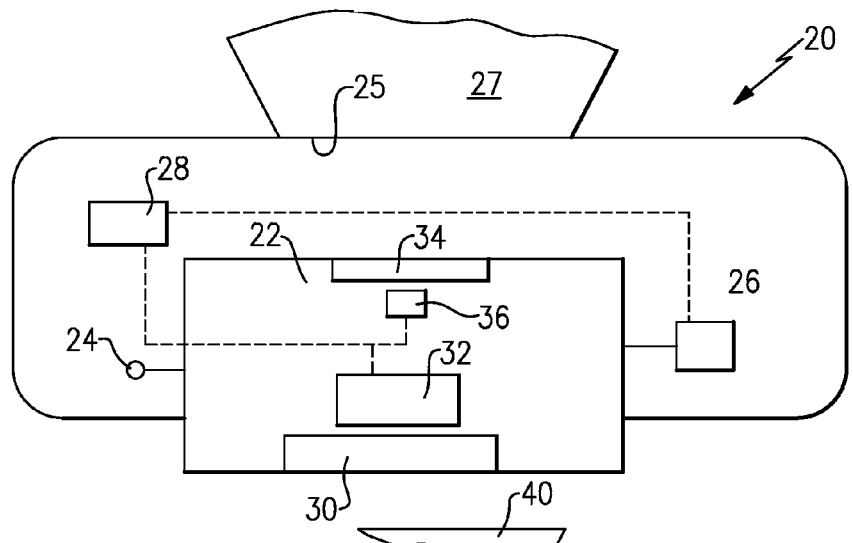
FIG. 1 schematically shows a pod.

FIG. 1 shows an integrated reconnaissance pod 20. A rotatable housing 22 is supported at 24 and driven to rotate relative to an outer housing 25 of the pod by a motor 26. In the prior art, such housings 22 mounted a window 30 and an image capture device 32 that may be operable to capture an electromagnetic image, such as an electro-optic camera or infrared camera. As shown, image capture device 32 communicates with a controller 28, and controller 28 gathers information from the device 32 with regard to captured images. As shown schematically, the pod housing 25 is mounted on an aircraft through a pylon 27. The images being captured are typically on the ground 40 beneath the pod 20.

While the disclosed housing 22 rotates, this application may extend to housings that move otherwise, such as translating, or changing pitch.

As mentioned above, at times, the image to be captured by the camera 32 may be obscured, or less effective than is desired. For example, if there is cloud cover over the ground of interest, the captured image may not be as clear as would be desired.

The present disclosure incorporates a radome 34 and a radar transmitting and reception system 36. As shown, system 36 also communicates with the controller 28. The controller 28 also communicates with the motor 26. The controller 28 thus receives captured images from both devices 32 and 36.

A worker of ordinary skill in the art would recognize how the controller 28 would identify a desired area on the ground 40 that should be captured. The motor 26 turns housing 22 to change an orientation of the camera 32 or the radar system 36 such that the image is captured from a desired location.

Figure 3A:
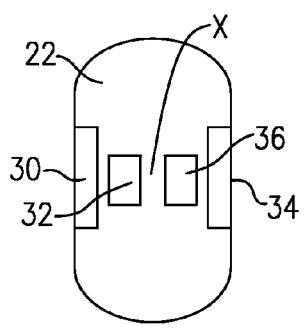
FIG. 3A shows a first orientation.

As shown in FIG. 3A, the window 30 and radome 34 are spaced by approximately 180° on an axis of rotation X through which the motor 26 drives the housing 22.

Figure 3B:
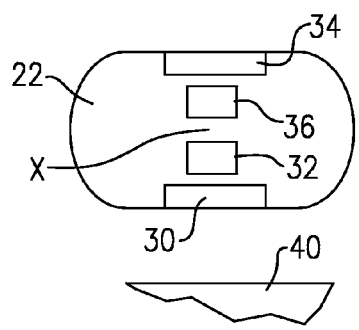
FIG. 3B shows a second orientation.

In FIG. 3B, the controller 28 controls the motor 26 to drive the housing 22 such that the window 30 faces the ground 40 and the camera 32 may capture an image such as an electro-optic or infrared image. It should be understood while the window 30 is shown generally perpendicular to the ground 40, it may be other than perpendicular and, thus, able to capture images across a wider swath of land.

Figure 3C:
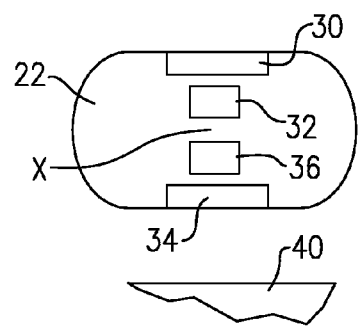
FIG. 3C shows a third orientation.

On the other hand, should the controller 28 wish to capture a radar image, the housing 22 may be rotated to a position such as shown in FIG. 3C. Now, the radome 34 faces the ground 40 and the radar system 36 may capture an image utilizing radar techniques. The image capture camera 32 and the radar system 36 may be generally as in the art. It is the provision of both systems within a single housing to which this disclosure is addressed.

While both the image camera 32 and radar 36 may be utilized independently of each other and capture images of different areas of the ground, it is also anticipated that a method of utilizing the pod 20 would include initially capturing images through the camera 36, but determining the conditions beneath the aircraft are more conducive to utilizing the radar. Thus, the method includes rotating the housing 22 from a position such as shown in FIG. 3B to the position such as shown in FIG. 3C such that a radar image is captured of the same area of the ground that was captured by the image camera 32. The pod 20 may also be constructed, arranged and oriented so that the image camera 32 and radar 36 simultaneously capture different images of the ground.

In alternatives, the image camera 32 may be on, while the radar 36 may be off. The image camera 32 may be off, with the radar 36 on. However, there may be further alternatives. As an example, in the embodiments shown in FIGS. 4A and 4B, the image camera and the radar camera may operate simultaneously, and may capture different areas of the ground, or may capture images of the same area.

Figure 4A:
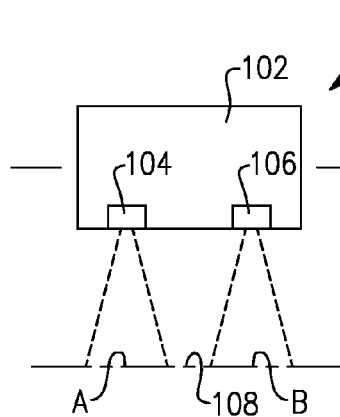
FIG. 4A shows a second embodiment.

As shown in FIG. 4A, in an embodiment 100, the housing 102 may include an image camera 104 and a radar 106 which are shown simultaneously capturing images of different areas A and B of the ground 18. In FIG. 4A, the image camera 104 and the radar 106 are spaced "side by side" along the axis of rotation X.

Figure 4B:
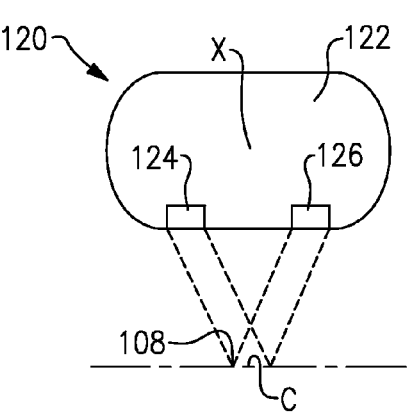
FIG. 4B shows a third embodiment.
Figure 2:
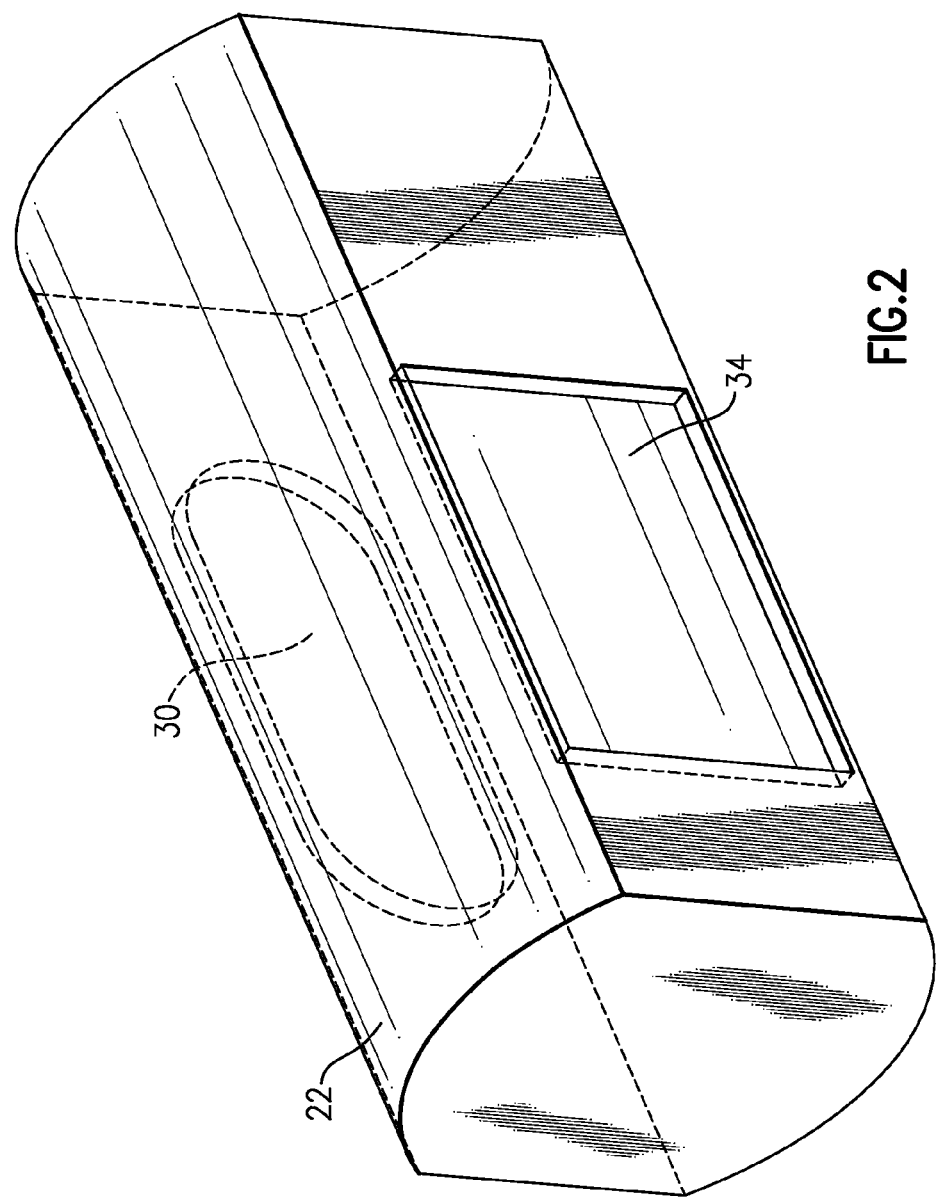
FIG. 2 shows a detail of a rotatable housing structure.

As shown in FIG. 4B, an embodiment 120 has the housing 120 with an image camera 124 and a radar 126 spaced by an angle of less than 180 degrees about the axis of rotation X. Here, the two may be capturing images of the same area of the ground 108C. It should be understood that the FIG. 4A embodiment could capture images of the same area of the ground simultaneously, while the embodiment of FIG. 4 may capture images of different areas of the ground.

The invention provides an integrated pod that combines the functionality of the image capture device with the radar device to, e.g., locate an area of interest using the radar device, and then capture surveillance or reconnaissance images of such area using the image capture device.

The radome is formed of a composite material that generally can transmit radar signals without changing those signals. It can be used in conjunction with synthetic aperture radar devices, mechanical scan radar devices, signal intelligence devices, and/or electronics intelligence devices, each of which are known in the art. Multi-spectral sensors may also be used, with the radome window material chosen to match the operating characteristics of the particular sensing device.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A surveillance device for gathering images of an area, comprising:
   a. a flight vehicle;
   b. a pod attached to the flight vehicle;
   c. a moveable housing within the pod and including an electromagnetic image capture device and a radar image capture device;
   d. a motor connected to the moveable housing;
   e. a motor controller connected to the motor, wherein the motor and motor controller are constructed and arranged to move the housing to a first orientation for at least one of the electromagnetic image capture device and the radar image capture device to capture a first image of the area while the vehicle is in flight, and additionally to move the housing to a second orientation for the other one of the electromagnetic image capture device and the radar image capture device to capture a second image of the area while the vehicle is in flight.

2. The surveillance device as set forth in claim 1, wherein the first image and the second image are of the same area.

3. The surveillance device as set forth in claim 1, wherein the first image and the second image are of different areas.

4. The surveillance device as set forth in claim 1, wherein the first and second orientations are the same orientation.

* * * * *

UNITED STATES PATENT AND TRADEMARK OFFICE
CERTIFICATE OF CORRECTION

PATENT NO. : 9,575,169 B2
APPLICATION NO. : 14/173008
DATED : February 21, 2017
INVENTOR(S) : Peter Colantonio Page 1 of 1

It is certified that error appears in the above-identified patent and that said Letters Patent is hereby corrected as shown below:

IN THE DETAILED DESCRIPTION:

Column 3, Line 2; after "the ground" replace "18" with --108--

Column 3, Line 6; before "with an image" replace "120" with --122--

Column 3, Line 11; after "embodiment of" replace "FIG. 4" with --FIG. 4B--

Signed and Sealed this
First Day of August, 2017

Joseph Matal
*Performing the Functions and Duties of the
Under Secretary of Commerce for Intellectual Property and
Director of the United States Patent and Trademark Office*